United States Patent [19]
Roth

[11] Patent Number: 5,669,957
[45] Date of Patent: Sep. 23, 1997

[54] DROSS COMPRESSION APPARATUS AND METHOD UTILIZING RIBS ON COLLECTOR AND HEAD

[75] Inventor: David J. Roth, Downingtown, Pa.

[73] Assignee: Altek International, Inc., Exton, Pa.

[21] Appl. No.: 662,176

[22] Filed: Jun. 12, 1996

[51] Int. Cl.$^6$ ............................ C22B 7/00; C22B 21/00
[52] U.S. Cl. ........................ 75/585; 75/672; 266/227
[58] Field of Search ............................ 266/227; 75/672, 75/585

[56] References Cited

U.S. PATENT DOCUMENTS

| | | |
|---|---|---|
| 201,817 | 10/1878 | Rees . |
| 563,769 | 7/1896 | Howard . |
| 2,278,135 | 8/1942 | Osborn ............................ 266/37 |
| 3,198,505 | 8/1965 | Amdur et al. ............................ 266/37 |
| 3,517,918 | 6/1970 | Cenkner ............................ 266/37 |
| 3,999,980 | 12/1976 | Montagna ............................ 75/37 |
| 4,003,559 | 1/1977 | Kuwano et al. ............................ 266/68 |
| 4,057,232 | 11/1977 | Ross et al. ............................ 266/204 |
| 4,386,956 | 6/1983 | Roth et al. ............................ 75/227 |
| 4,527,779 | 7/1985 | Roth et al. ............................ 266/24 |
| 4,565,572 | 1/1986 | van Linden et al. ............................ 75/24 |
| 4,575,056 | 3/1986 | Julliard et al. ............................ 266/277 |
| 4,637,591 | 1/1987 | McMahon et al. ............................ 266/165 |
| 4,772,320 | 9/1988 | van Linden et al. ............................ 75/68 |
| 4,948,102 | 8/1990 | Otsuka et al. ............................ 266/205 |
| 5,397,104 | 3/1995 | Roth ............................ 266/227 |

FOREIGN PATENT DOCUMENTS

| | | | |
|---|---|---|---|
| 66213 | 6/1970 | Japan | ............................ 75/672 |

*Primary Examiner*—Melvyn Andrews
*Attorney, Agent, or Firm*—Michael F. Petock, Esquire

[57] ABSTRACT

A dross compression apparatus and method utilizes a dross compression head and a skim box or collector having mating ribs. The ribs may be any type of projection or shape of the head and skim box sufficient to form grooves in both sides of the dross which divide or substantially divide the dross. Improved plating of the aluminum metal and separation of the aluminum layers from the aluminum oxide are achieved by using pressures in the range of 50 to 70 pounds per square inch. The ribs by their cutting action through the dross enable the achieving of these pressures with lower rated hydraulic presses. Two specific embodiments are disclosed, one utilizing an elongated substantially hemispheric shaped head and the other utilizing a substantially hemispheric shaped head. In both embodiments, the head and receptacle or skim box are of substantially conforming shapes.

9 Claims, 7 Drawing Sheets

DROSS COMPRESSION APPARATUS AND METHOD UTILIZING RIBS ON COLLECTOR AND HEAD

FIELD OF THE INVENTION

This invention relates to an improved apparatus and method for the recovery of non-ferrous metal, particularly aluminum from dross which has been skimmed from a furnace. More particularly, the present invention relates to an apparatus and method of more effectively grooving both sides of the dross material for ease of separation and increasing the thickness and extent of the plating action.

BACKGROUND OF THE INVENTION

Aluminum dross is a combination of aluminum metal and aluminum oxides, as well as other possible components such as various oxides, nitrates and carbides. Aluminum dross constitutes a by-product of an aluminum melting operation. Generally, the dross floats on the top of the molten aluminum metal in the furnace. Aluminum dross may contain anywhere from (10%) to ninety (90%) percent aluminum depending upon the particular processing technique and the type of furnace.

The dross in an aluminum melting operation includes a significant amount of aluminum which is considered to be a valuable resource to be recovered. The present invention is directed at maximizing the recovery of aluminum from dross and providing an apparatus and method of more effectively and efficiently carrying out the dross recovery process. The present invention may be used in the recovery of various non-ferrous metals from various types of dross.

Various work has been done in the past on dross recovery systems for aluminum melting operations including work disclosed in my previous patent, U.S. Pat. No. 5,397,104, issued on Mar. 14, 1995. Prior work in the field of the recovery of aluminum from dross is also disclosed in U.S. Pat. Nos. 4,529,779—Roth, et al. and 4,386,956—Roth, et al., of which I am one of the joint inventors. Further background information is provided in these patents. The teachings of all three of the aforesaid patents are incorporated herein by reference the same as if set forth at length.

SUMMARY OF THE INVENTION

Briefly and basically, in accordance with the present invention, a dross compression apparatus is provided wherein a receptacle of a dross collector and a compression head have mating ribs formed thereon. The term rib as utilized herein is understood to mean broadly any projection or shape of the receptacle of the collector and any projection or shape of the compression head which forms a projection, raised area or ridge, corner or noncontinuity such that an edge so formed by any such projection or shape forms a groove in the dross between the collector and the compression head. The term rib herein is defined to cover all such structures. The concept is to provide mating structures referred to herein as ribs, which will form mating grooves in both surfaces of the dross such that the dross material is either completely divided or substantially completely divided. This enables a cutting or dividing action of the resulting dross, sometimes referred to as a skull, to be more easily recycled. Without this cutting or dividing action of the skull, it may be in many instances substantially impossible or impractical to efficiently reprocess the dross material as the pieces would be too large and difficult for the furnaces.

In one of the preferred embodiments, the dross compression apparatus is provided with a receptacle and head with a substantially oblong or elongated substantially hemispheric shape. The terms substantially oblong shape or elongated substantially hemispheric shape are broadly defined to mean any shape that is substantially similar in concept and function to the shapes shown in drawing FIGS. 1-4, and include shapes that deviate from the shapes shown such as flatter structures or more pointed structures as well as structures that may have additional curves placed in them. This shape may be provided with a plurality of mating ribs, as broadly defined above, on both the receptacle and the compression head. Two or more hydraulic cylinders may be utilized in spaced relationship to force the compression head against the material.

Alternatively, a substantially hemispherical shape may be utilized. The term substantially hemispherical is broadly defined to mean any shape that is substantially hemispherical, and includes flatter structures, more pointed, pyramidal or conical structures and structures that may be out of round but still fall within the scope and spirit of the present invention.

In accordance with the method of the present invention, improved plating action of the free aluminum on the outer surface of the skull is achieved, increasing the plating thickness and separation of the free aluminum on the skull, by providing a head pressure in the range of 50 to 70 pounds per square inch. Such high surface pressures of the dross head interface are enhanced by the mating ribs or the special "V" design which allows achievement of these higher pressures with lower rated hydraulic systems driving the compression head. The oblong shape with the multiple cylinders driving the head also enhances the ability to achieve increased head pressures.

The skull that is produced under these conditions of 50 to 70 pounds per square inch of pressing force is very friable and the aluminum separates easily from the inner-oxide core. With head pressures in the range of 50 to 70 pounds per square inch of pressing surface, the skull is produced having a solid all aluminum outer surface which enhances secondary recovery. Such skulls with thicker aluminum would be difficult or impossible to charge into the secondary furnaces because of their size and toughness, but the mating rib design allows for the practical use of not only the higher pressures, but provides a dross that is readily handled at the secondary processors. Further, superior secondary recoveries may be achieved due to the increased plate thickness of the aluminum as a result of the higher pressures.

In accordance with the present invention, the compression head and the receptacle of the collector is formed from alloy cast steel. The alloy cast steel is better able to withstand the increased pressures and reduces the thermiting reaction. The head may be air or water cooled.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
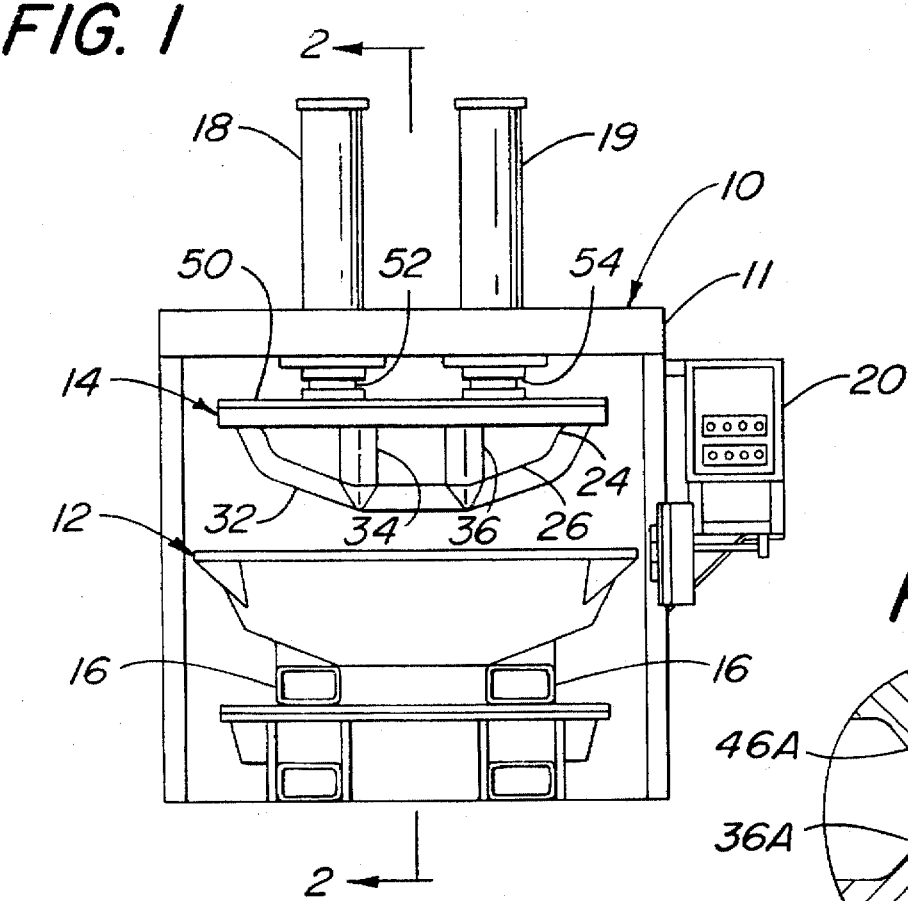
FIG. 1 is an elevation view of a dross compression apparatus utilizing mating ribs on the collector and head in accordance with the present invention.

Referring now to the drawings in detail wherein like numerals indicate like elements, there is shown in FIG. 1 a dross compression apparatus 10 which includes a dross collector 12 and a compression head 14. Dross collector 12 is provided with tubular members 16 which may receive the forks of a forklift truck for transporting the dross collector from the furnace to the dross compression apparatus 10.

Dross compression apparatus 10 includes a hydraulic drive for operation of compression head 14 which includes hydraulic cylinders 18 and 19. It is understood that other suitable drives may be utilized including pneumatic, electrical with appropriate gearing and other drive means. However, the drive means is preferably a hydraulic drive which provides a desired pressure in the range of 50–70 pounds per square inch on the dross to be compressed between compression head 14 and collector 12. However, it is understood that the apparatus and method will operate effectively at other pressures, including the 20 to 30 pounds per square inch utilized in my prior presses. Further, it is understood to be within the scope of the present invention to have the drive means drive the collector upward into a stationary head or to have both the collector move upwardly and the compression head move downwardly. However, the presently preferred embodiment is to provide a stationary collector with a suitable drive means for driving the compression head downwardly into the collector.

A control panel 20 is provided for controlling the operation of dross compression apparatus 10 after doors 22 and 23 are closed.

Figure 2:
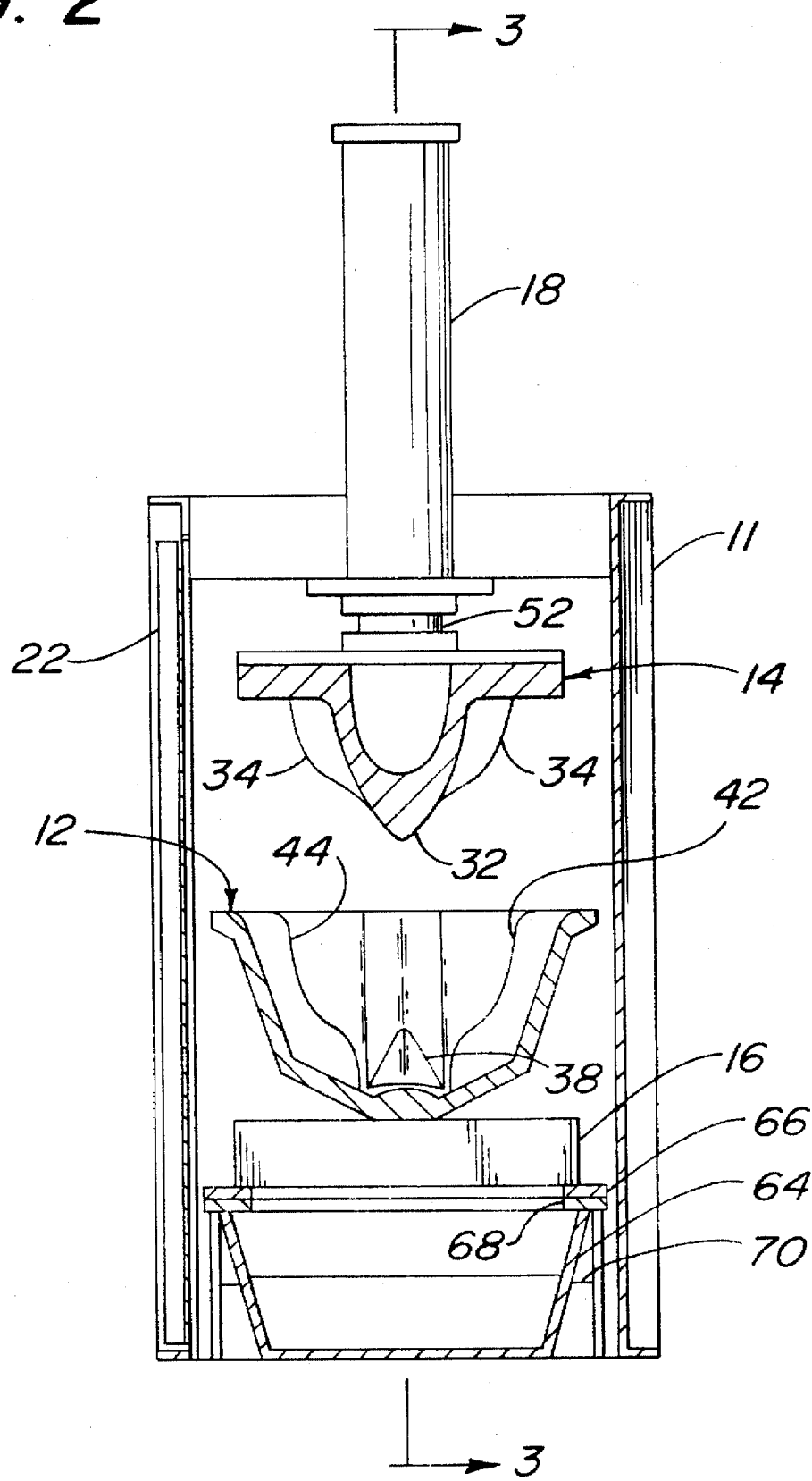
FIG. 2 is a cross-sectional view taken along line 2—2 of FIG. 1.

As may be best seen in FIGS. 1–4, compression head 14 may be referred to as an elongated substantially hemispherically shaped head. However, as illustrated in the drawings, it is not a true or exact hemispheric shape and the invention is not intended to be limited in any way to an elongated hemispheric shape. As may be seen from front elevation view in FIG. 1, there are curvatures deviating from any true hemispheric shape including a concave area 24 and a flattened area 26. Additionally, reference to a cross-sectional view as shown in FIG. 2 illustrates head 14 as being more akin to conical than hemispherical. Accordingly, the term substantially oblong shape or elongated substantially hemispheric shape are broadly defined to mean any shape that is substantially similar in concept and function to the shape shown in drawing FIGS. 1–4, and include shapes that deviate from the shapes shown, such as flatter structures or more pointed structures, as well as structures that may have additional curves placed in them. Nevertheless, for convenience, the head in the specification and claims will be referred to as oblong or elongated substantially hemispheric shaped, without limiting its scope.

Dross collector 12, which may be referred to in this industry as a skim box, includes a receptacle 30 adapted to cooperate with compression head 14. The receptacle 30 of collector 12 and compression head 14 have shapes which substantially conform to the shape of the other as illustrated in the drawings. Compression head 14 and receptacle 30 have mating ribs. That is, compression head 14 is provided with ribs on the outer surface of the head and these ribs mate with ribs positioned on the inner surface of receptacle 30 such that mating grooves are formed in both sides of the material formed between the head and the receptacle. The groove forming structures referred to herein on the head and the receptacle of the collector will be referred to in the specification and claims as ribs although it is understood that the term rib or ribs broadly means any projection or shape of the receptacle of the collector and any projection or shape of the compression head which forms a projection, raised area or ridge, corner or noncontinuity such that an edge so formed by any such projection or shape forms a groove in the dross between the collector and the compression head. The term rib as used in the specification and claims is defined to cover all such structures. The concept is to provide mating structures referred to herein as ribs, which will form mating grooves in both surfaces of the dross such that the dross material is either completely divided or substantially completely divided. This enables a cutting or dividing action of the resulting dross, sometimes referred to as a skull which enables it to be more easily recycled. Without this cutting or dividing action of the skull, it may be in many instances substantially impossible or impractical to efficiently reprocess the dross material as the pieces would be too large and difficult for the furnaces. Furthermore, the grooving caused by such edges or ribs of the head and receptacle provide cutting or V shaped structures which enhance the ability to provide the increased pressures in the range of 50–70 pounds per square inch with lower rated hydraulic presses.

Referring now to the ribs or rib-like structures in greater detail, there is shown in FIG. 1 ribs 32, 34 and 36 on head 14. For convenience, rib 32 may be referred to as the longitudinal rib and ribs 34 and 36 referred to as transverse ribs. However, it is understood that various other rib arrangements may be utilized so long as the ribs on the head mate with the ribs in the receptacle.

Longitudinal rib 32 mates with longitudinal ribs 38 and 40 of receptacle 30. Transverse rib 34 mates with transverse ribs 42 and 44 of receptacle 30 of collector 12. Transverse rib 36 of head 14 mates with transverse ribs 46 and 48 of receptacle 30. It is understood that other arrangements of ribbing may be utilized within the scope of the present invention, including the providing of more or less ribs, so long as at least one of the rib-like structures on the head mates with at least one of the rib-like structures on the receptacle of the collector. However, the arrangement as described and shown on the drawings is the presently preferred embodiment. Head 14 may be provided with a cover plate 50. Cover plate 50 is connected to the head and to pistons 52 and 54 of hydraulic cylinders 18 and 19, respectively. Hydraulic cylinders 18 and 19 cause pistons 52 and 54 to be controllably raised and lowered under hydraulic pressure in response to signals received from control panel 20. Such control of hydraulic cylinders is well known in the art.

Compression head 14 may be cooled by circulating air or water through head 14 as is well known in the art. With respect to possible water cooling of the head, reference may be had to the disclosure of U.S. Pat. No. 5,397,104, incorporated herein by reference.

Figure 5:
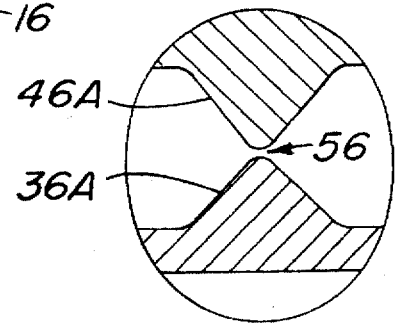
FIG. 5 is an exploded cross-sectional view of an alternate embodiment taken in the labeled circle area of FIG. 4.
Figure 4:
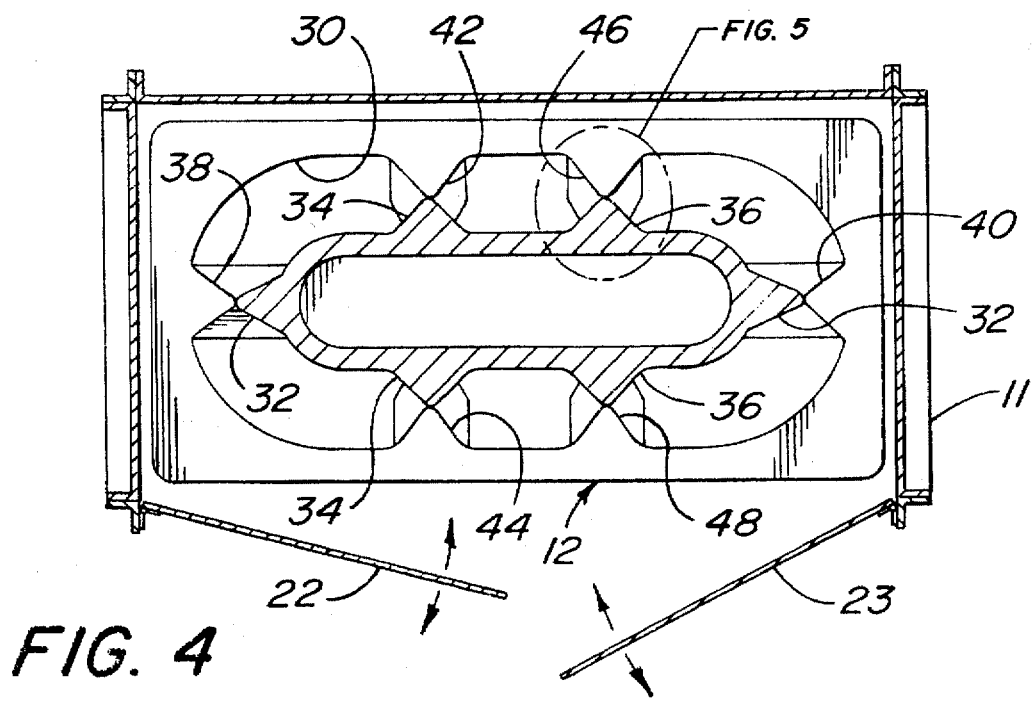
FIG. 4 is a cross-sectional view taken along line 4—4 of FIG. 3.
Figure 3:
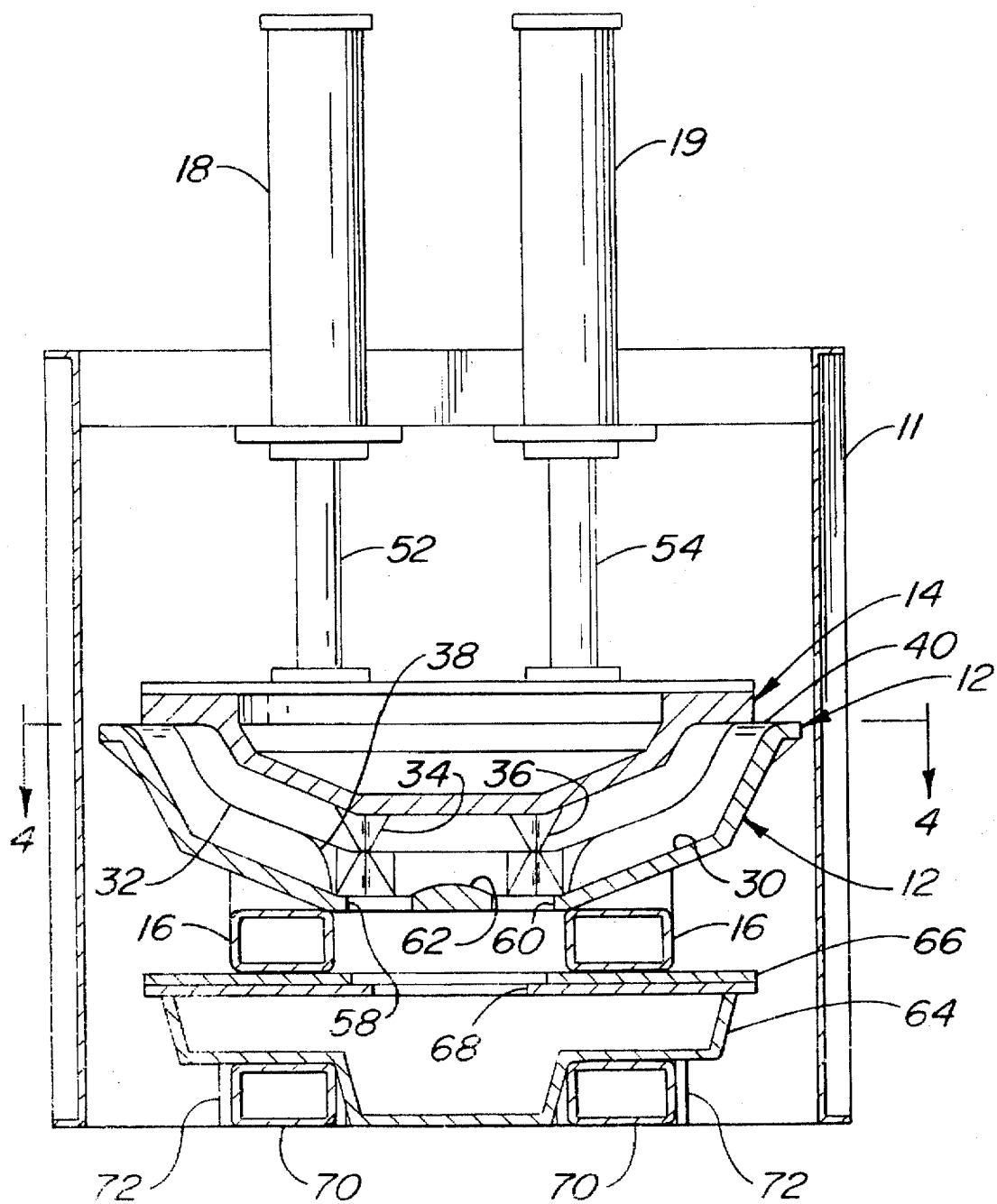
FIG. 3 is a cross-sectional view taken along line 3—3 of FIG. 2.

Mating ribs on compression head 14 and the ribs on receptacle 30 of collector 12 may actually come in contact with each other as illustrated in FIGS. 3 and 4, or alternatively, as illustrated in the exploded view of FIG. 5, there may be a gap 56 between rib 46A of receptacle 30 and rib 36A of head 14. Gap 56 may typically be in the range of ¼–½ inch, but other dimensions may be utilized within the spirit and scope of the present invention.

Receptacle 30 of collector 12 is provided with one or more openings 58, 60. The number of openings as well as their position in collector 12 may vary. Preferably, these openings will be located in a lower portion of collector 12 or the lower most portion. A raised area 62 may be provided between openings to prevent a flat surface between the openings.

As may be best seen in FIGS. 1, 2 and 3, a container or sow mold 64 is provided under collector 12. Sow mold 64 may be provided with one or more plates 66 having openings 68 therein. Plates 66 are utilized to support collector 12. Sow mold 64 is provided with its own forklift tubes 70. Sow mold 64 may be provided with support bars or plates 72 to help support the weight and force of the pressing action. In accordance with the present invention, collector 12 may be placed on top of sow mold 64 to enable transporting of the combined collector and sow mold to the press as a unit. The connection between collector 12 and sow mold 64 may have an interlocking structure to prevent one from sliding with respect to the other, such as a projection on one and an indentation on the other. (Not shown)

In operation in accordance with the method of the present invention, dross is collected from an electric furnace, gas furnace or the like in receptacle 30 of collector 12. The dross collector or skim box 12 may be promounted on sow mold 64 and the two transported as a unit to the dross compression apparatus 10. Alternatively, the two may be transported separately to the dross compression apparatus 10, but preferably, it is more efficient to transport them together.

Figure 10:
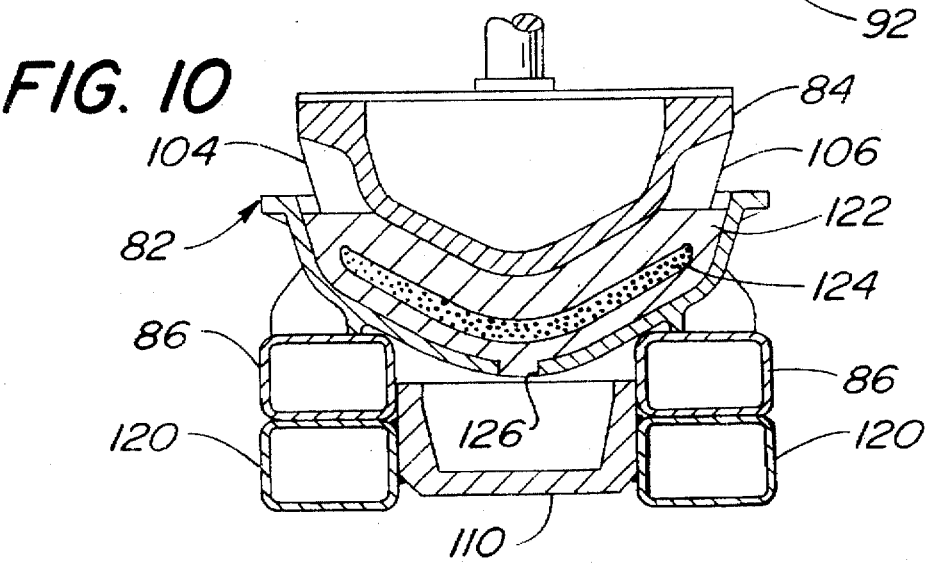
FIG. 10 is a cross-sectional view of dross being compressed between a compression head and a collector corresponding to the embodiment of FIGS. 6–9.

After the dross collector or skim box 12 and sow mold 64 are positioned within the housing 11 of dross compression apparatus 10, the doors 22 and 23 are closed. On operation of the controls 20, compression head 14 is lowered by pistons 52 and 54 of hydraulic cylinders 18 and 19. Metal, particularly aluminum, is allowed to decant through openings 58 and 60 in collector 12 and opening 68 in plates 66 of sow mold 64. The dross is then compressed by applying pressure by compression head 14. Preferably and in accordance with the present invention, pressure in the range of 50 to 70 pounds per square inch is applied to the dross between compression head 14 and receptacle 30. This pressure produces improved plating action of the aluminum metal with respect to the aluminum oxide core, producing improved plating action or separation between the aluminum metal and the aluminum oxide core as well as an increased thickness of aluminum plate on the outside. The mating ribs on the compression head and receptacle 30 form grooves in both sides of the material either dividing the material or substantially dividing it. Further, the projecting mating ribs enhance the ability to achieve the desired pressure range on the material due to its dividing action or cutting through of the material. The method will be discussed further with respect to FIG. 10.

Referring now to FIGS. 6–10, there is shown another embodiment of the present invention which utilizes mating ribs on the head and receptacle wherein the head and receptacle may be described as being substantially hemispherically shaped, as contrasted to an elongated hemispheric shape. Again, the term substantially hemispheric shape is intended and defined to cover the head and receptacle having substantially similar shapes without limiting the scope of the invention to any true or closely hemispheric shape. Specifically, the head and receptacle may be flatter, more pointed or conical, pyramidal or out of round when viewed in plain view. As described with respect to the previous embodiments, a head may have additional curves and shapes and the preferred embodiments illustrated have curves and shapes which deviate substantially from any true hemispheric shape.

Referring now more specifically to the drawing figures, there is shown a dross compression apparatus 80 which includes a dross collector 82 and a dross compression head 84. Dross collector 82 is provided with forklift tubular members 86. In other words, tubular members 86, as well as 16 in the previous embodiment are utilized wherein the forks of a forklift truck may be inserted to safely lift the collector for movement about the facility. Other means for securing the collector to the forks of a forklift truck may be utilized in practicing the present invention.

Hydraulic cylinder 88 is provided to operate compression head 84. As described with respect to the previous embodiment, other suitable drive means may be utilized. Control panel 90 is provided for controlling the operation of dross compression apparatus 80. Dross compression apparatus 80 is provided with a housing 81 and a door 92 for obtaining access.

Figure 6:
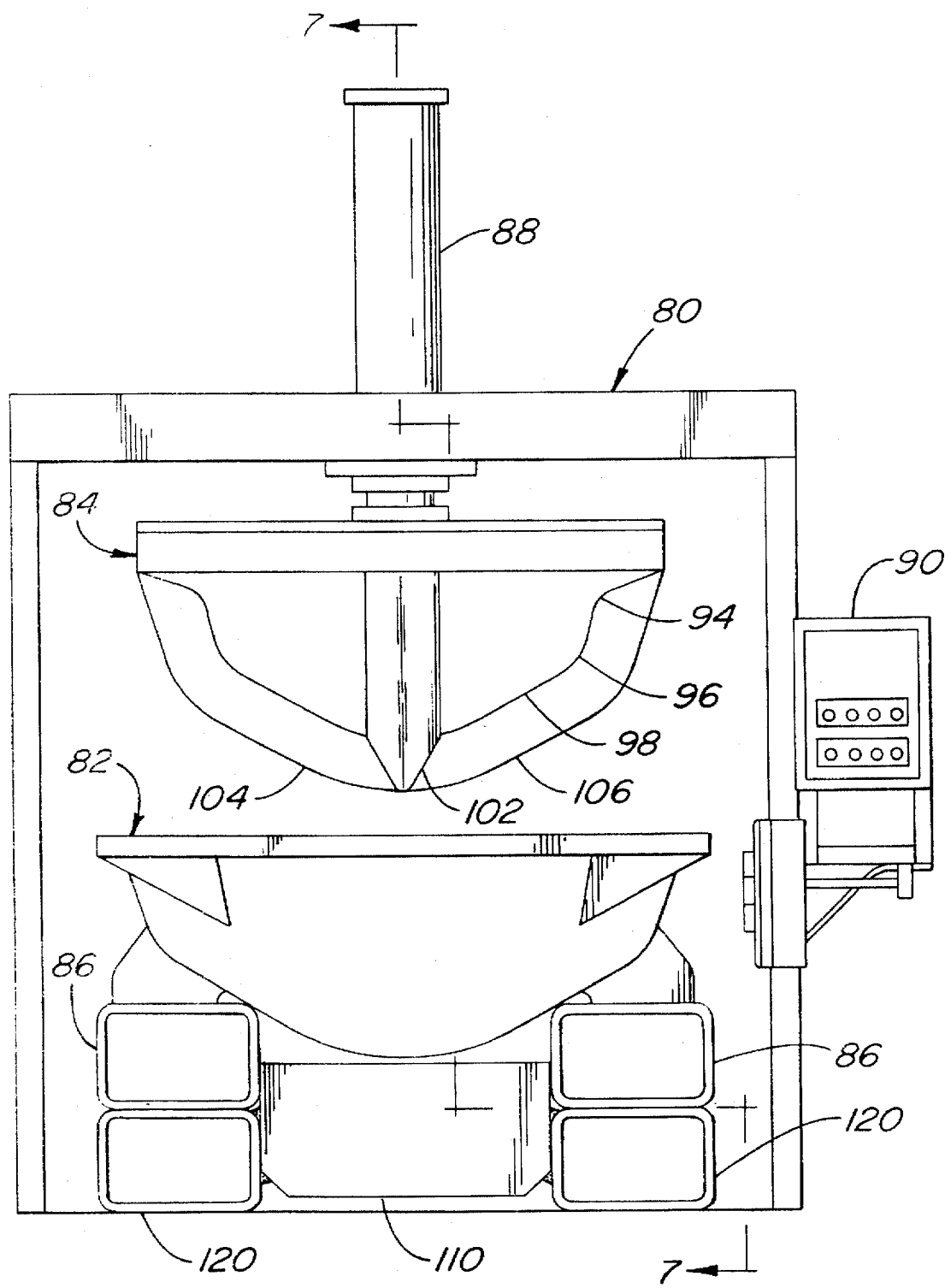
FIG. 6 is a front elevation view of another embodiment of a dross compression apparatus utilizing mating ribs on the collector and head in accordance with the present invention.
Figure 7:
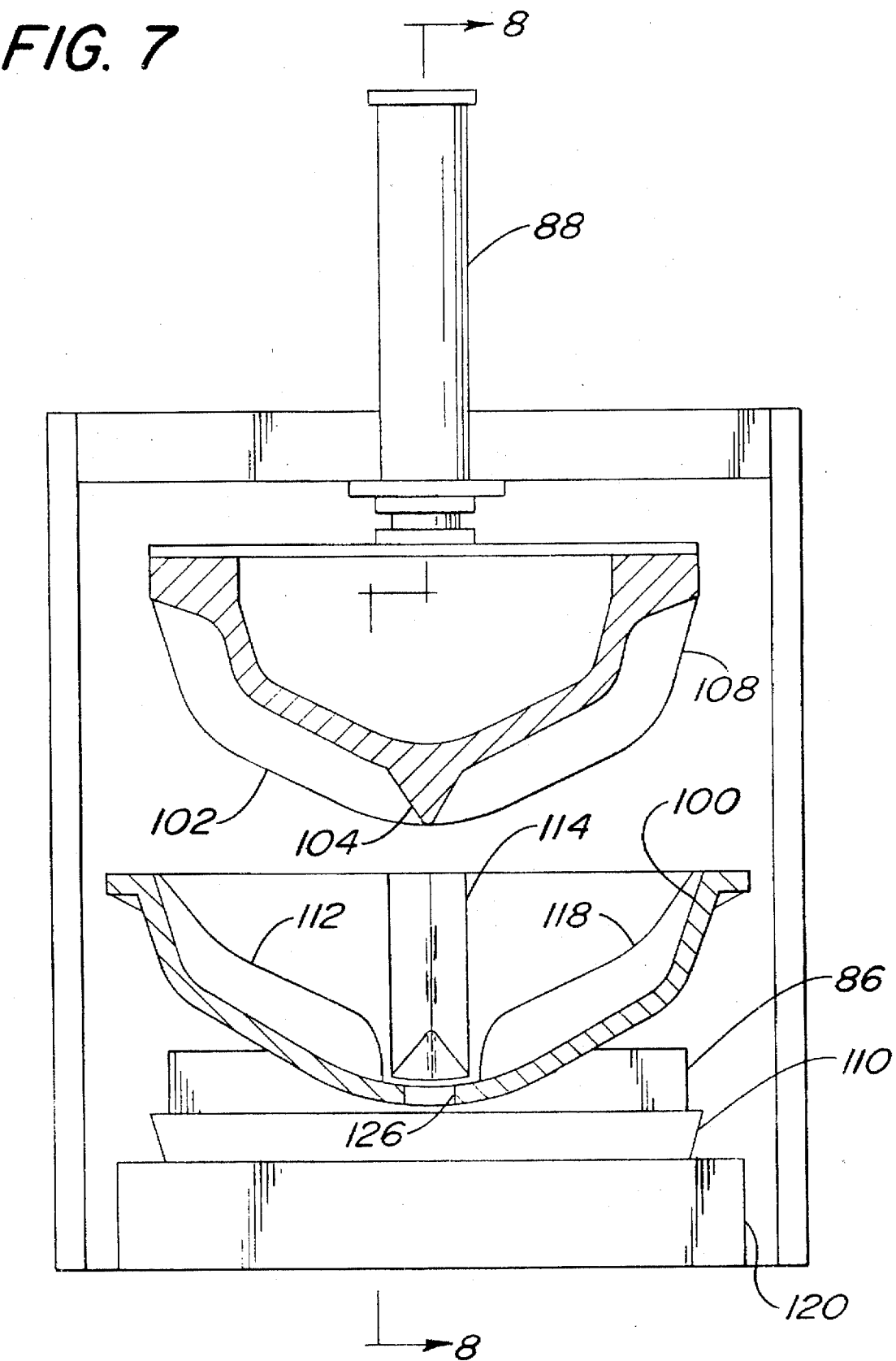
FIG. 7 is a cross-sectional view taken along line 7—7 of FIG. 6.
Figure 8:
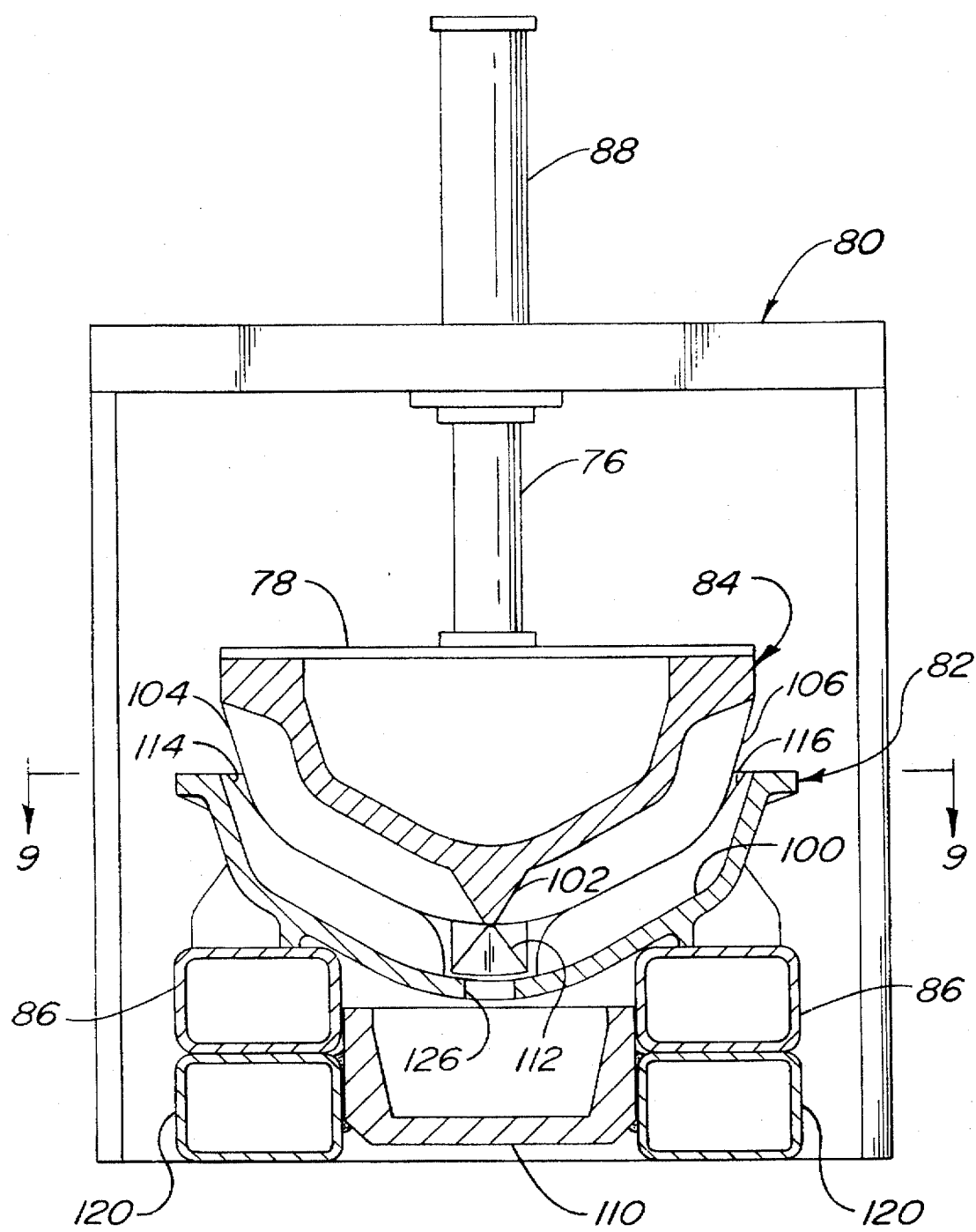
FIG. 8 is a cross-sectional view taken along line 8—8 of FIG. 7.
Figure 9:
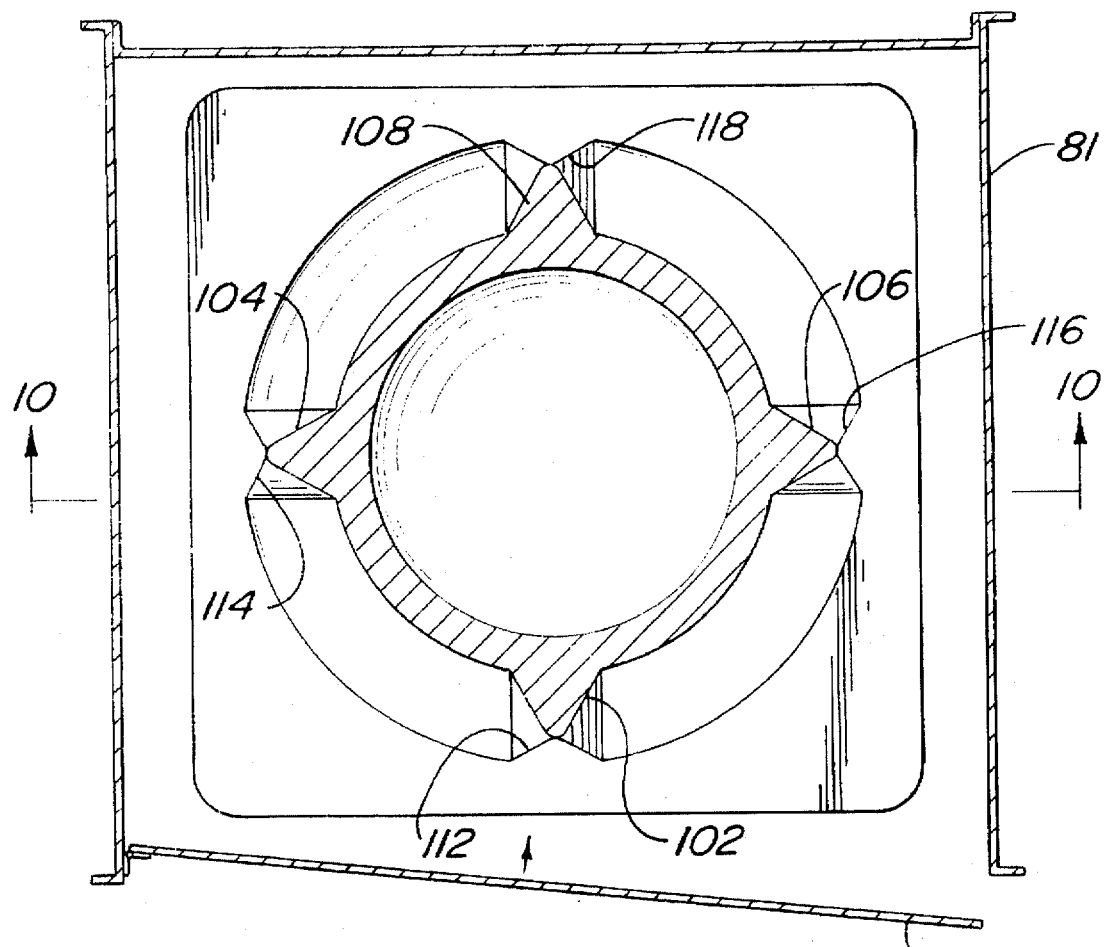
FIG. 9 is a cross-sectional view taken along line 9—9 of FIG. 8.

As may be best seen in FIGS. 6, 7 and 8, the preferred embodiment of head 84 has several deviations from a true hemispheric shape including concave portion 94, convex area 96 and somewhat flattened area 98. Further, the entire area 98 may be more flattened or more pointed, conical or pyramidal shaped wherein the edges of the pyramidal shape may be utilized to form the ribs for forming the grooves in the dross. Pyramidal shape is defined herein to mean broadly a figure having a polygonal base, the sides of which form the bases of triangular surfaces meeting at a common vertex. That is, the pyramid may have 3, 4, 5, 6 or some other number of sides.

Compression head 84 and the receptacle 100 of collector 82 are adapted to cooperate such that the head and the receptacle are of substantially conforming shapes. This is illustrated in the drawings.

Head 84 is provided with four ribs 102, 104, 106 and 108 extending substantially from the lower most portion to substantially the uppermost portion of head 84. Receptacle 100 is provided with mating ribs 112, 114, 116 and 118. In other words, rib 102 mates with rib 112, rib 104 mates with rib 114, rib 106 mates with rib 116 and rib 108 mates with rib 118. However, it is understood that more or less than four sets of mating ribs may be utilized. Furthermore, the ribs may be arranged differently within the scope and spirit of the present invention. Further, as described above, the term ribs is defined to include any type of projecting structure or shape of the head and receptacle which will form a projection or edge which would groove the dross material dividing it or substantially dividing it in accordance with the teachings of the present invention.

This embodiment of the present invention is provided with a sow mold 110 for the collection of metal; such as aluminum. Sow mold 110 is provided with forklift tubes 120. Forklift tubes 120 are physically mounted, such as by welding or other means to sow mold 110. Forklift tubes 86 are physically mounted to collector 82. Collector tubes 82 may be removably interlockingly mounted along side sow mold 110 and over the sow mold tubes 120 for purposes of transporting collector 84 and sow mold 110 as a unit.

Dross collector 82 is provided with one or more openings 126 which enables a non-ferrous metal, such as aluminum to decant from receptacle 100 into sow mold 110. In the presently preferred embodiment, a single opening 126 is provided in the lower most portion of receptacle 100. However, it is understood that more than one opening may be provided so that the openings need not be at the lowest portion of receptacle 100.

In a manner similar to the previous embodiment, head 84 may be provided with a plate 78 which connects to piston 76 of hydraulic cylinder 88. Head 84 may be air or water cooled as described with respect to the other embodiment.

In accordance with the method of the present invention, a preferred pressure range of 50–70 pounds per square inch of pressure is applied to the dross material between compression head 84 and collector 82. This pressure range results in improved plating action of the metal or aluminum 122 and improved layering of the metal 122 with respect to the aluminum oxide core 124. In actual practice, aluminum would also be within skim box 110, but for clarity of the drawing illustration, aluminum metal is not shown in sow mold 110.

In a manner similar to the other embodiment, dross from a non-ferrous melting operation is captured in receptacle 100 of collector 82. Collector 82 and sow mold 110 are preferably united at the furnace, but may be united elsewhere. Preferably, the sow mold 110 and skim box 82 are transported to the dross pressing apparatus 80.

The compression head and the collector 82 are brought pressingly together by a drive. As described above, this may be the collector being raised upwardly toward the head, the head being raised downwardly and the collector being raised upwardly or, as presently preferred, with the head being pressed downwardly into collector 82. As may be seen in FIG. 10, aluminum metal may be decanted through opening 126 in collector 82 into the sow mold. Additionally, as the pressure is applied by head 84, and particularly in the preferred pressure range of 50 to 70 pounds per square inch, an improved relatively thick plate of aluminum 122 is formed over an inner aluminum oxide core. Ribs such as 104 and 106, operating in conjunction with the mating ribs of the collector, enable a dividing action and facilitate the ability to apply the desired pressures to the dross material. This results not only in a divided or substantially divided dross material between the head and the collector, but produces an improved aluminum plating action and a skull (comprised of aluminum 122 and aluminum oxide core 124) which is very friable.

The present invention may be embodied in other specific forms without departing from the spirit or essential attributes thereof and, accordingly, reference should be made to the appended claims, rather than to the foregoing specification as indicating the scope of the invention.

I claim:

1. A dross compression apparatus, comprising:
    a dross collector, said collector including a receptacle with at least one rib on an inner surface of said collector; and
    a compression head adapted to cooperate with said receptacle of said dross collector, said head being of a shape substantially conforming to the shape of said dross collector and provided with at least one rib on an outer surface of said head with said rib being positioned to mate with said rib of said receptacle of said dross collector such that mating grooves are formed in both sides of the material formed between said head and said receptacle.

2. A dross compression apparatus in accordance with claim 1 wherein said at least one rib on said receptacle of said dross collector and said at least one rib on said compression head substantially come into contact upon full stroke of said compression head.

3. A dross compression apparatus in accordance with claim 1 wherein said compression head in cooperation with said collector are adapted to provide a pressure in the range of 50 to 70 pounds per square inch on said material formed between said head and said receptacle.

4. A dross compression apparatus in accordance with claim 1 wherein said dross collector is provided with a receptacle having a substantially oblong shape, said compression head being provided with an elongated substantially hemispheric shape adapted to mate with said receptacle.

5. A dross compression apparatus in accordance with claim 4 including at least two hydraulic cylinders provided in spaced relationship to force said head against said material.

6. A dross compression apparatus in accordance with claim 1 wherein said receptacle of said dross collector is provided with a plurality of ribs and said compression head is provided with a plurality of ribs adapted to mate with said ribs of said receptacle.

7. A dross compression apparatus in accordance with claim 1 wherein said compression head and said at least one rib on the outer surface is constructed from cast alloy steel.

8. A method for improved recovery of non-ferrous metal from dross containing a non-ferrous metal and oxides, comprising the steps of;
    pressing dross between a receptacle and a compression head wherein said receptacle and said compression head have mating ribs which substantially contact each other upon full compression; and
    applying a force to dross between said receptacle and said compression head at a pressure in the range of 50 to 70 pounds per square inch to produce a non-ferrous metal layer and an inner oxide core from the dross between said receptacle and said head.

9. A method for improved recovery of aluminum from dross containing aluminum and oxides, comprising the steps of:
    pressing dross between a receptacle and a compression head wherein said receptacle and said compression head have mating ribs which substantially contact each other upon full stroke of said compression head; and
    applying force to said compression head to produce pressure on the dross at a pressure in the range of 50 to 70 pounds per square inch to produce an aluminum layer and an inner-oxide core from the dross between said receptacle and said head.

* * * * *

UNITED STATES PATENT AND TRADEMARK OFFICE
CERTIFICATE OF CORRECTION

PATENT NO. : 5,669,957
DATED : September 23, 1997
INVENTOR(S) : David J. Roth

It is certified that error appears in the above-indentified patent and that said Letters Patent is hereby corrected as shown below:

Column 5, line 36, change "promounted" to "premounted".

Column 6, line 64, change " ; " to " , ".

Signed and Sealed this

Twenty-fifth Day of November, 1997

Attest:

BRUCE LEHMAN

Attesting Officer

Commissioner of Patents and Trademarks